July 11, 1950 — F. H. DALRYMPLE — 2,515,080
CONVEYER CHAIN
Filed Aug. 16, 1947 — 2 Sheets-Sheet 1

INVENTOR.
FERDINAND H. DALRYMPLE
BY George W. Saywell
ATTORNEY.

July 11, 1950 F. H. DALRYMPLE 2,515,080
CONVEYER CHAIN
Filed Aug. 16, 1947 2 Sheets-Sheet 2

INVENTOR.
FERDINAND H. DALRYMPLE
BY
George W. Saywell
ATTORNEY.

Patented July 11, 1950

2,515,080

UNITED STATES PATENT OFFICE 2,515,080

CONVEYER CHAIN

Ferdinand H. Dalrymple, Bedford, Ohio

Application August 16, 1947, Serial No. 768,951

6 Claims. (Cl. 198—195)

The invention relates to chain and particularly to an attachment for use on multi-strand chain conveyors having connected-to-chain carriers, such as apron conveyors, apron feeders, cross-slat conveyors, platform conveyors, etc.

The instant invention presents definite improvements over certain well-known chain and attachment structures some of which are as follows:

A so-called "A-attachment" is commonly used. This "A-attachment" is an angle section on one side of one chain link having a top platform to which the conveyor cross carrier is secured inboard of the chain. The use of the "A-attachment" causes a concentration of the loads on one side of the chain and this condition, unless compensated for by the use of through rods between the several chains of the conveyor or other strengthening means, results in short lived conveyors because of eccentric loading. If through rods are not used with these "A-attachment" chains, it is usual procedure to select chains having higher factors of safety than the service actually requires in order to compensate for the eccentric loading. For "A-attachment" chain the chain rollers, being outboard of the conveyor cross-carrier, are often used as supports for the return run.

The primary objects of the invention are to provide an attachment for conveyor chain which has means, as an integral part of the attachment itself, for carrying the return run of the chain conveyor on various forms of supports mounted in the conveyor supporting structure, and also to provide an attachment which will obviate the necessity of through rods between the chain strands, or other special means, to compensate for eccentric loading or other conditions inducing severe stress.

The annexed drawings and the following description set forth in detail certain means illustrating the improvements in chain, such means showing, however, only a few of the various forms in which the principle of the invention may be embodied.

Figure 8:
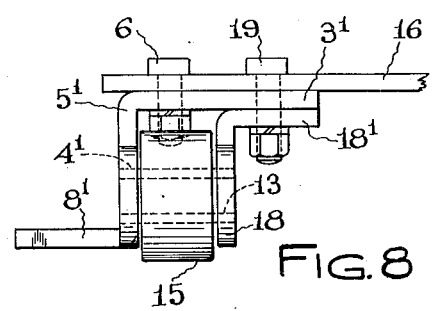
Figure 8 is an end view of a roller or inside chain link, showing the improved attachment providing one side bar, and a lug or so-called "A-attachment" integral with the other side bar, the two attachments being bolted together and both bolted to a cross-slat or carrier plate.
Figure 9:
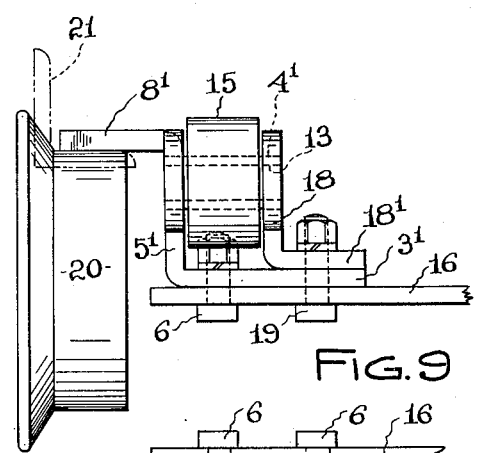
Figure 10:
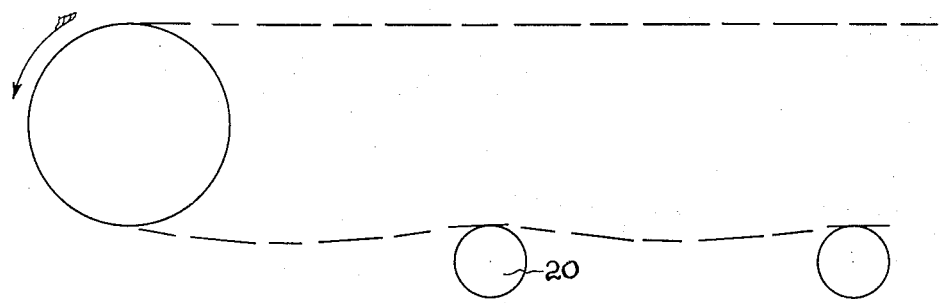

Figure 9 is an end view of the structure shown in Figure 8, except that the structure is upside down as it would be on a return run of the chain, the figure also showing a roller which can be mounted in the supporting structure for the conveyor, which roller is engaged by the attachment support on one side of the conveyor on the return run, there also being suggested in Figure 9 an angle also secured to the supporting conveyor structure which can be used for supporting engagement of one side of the conveyor on its return run, either alone or in connection with rollers such as shown in the figure; and Figure 10 is a diagrammatic illustration of one of the improved attachment chains of the conveyor at one end of its endless travel, the figure showing portions of both the active run and the return run, the support portion of the attachment on one side of the conveyor on the return run engaging rollers mounted in the supporting conveyor structure, which rollers break up the natural catenary of the return run.

Figure 1:
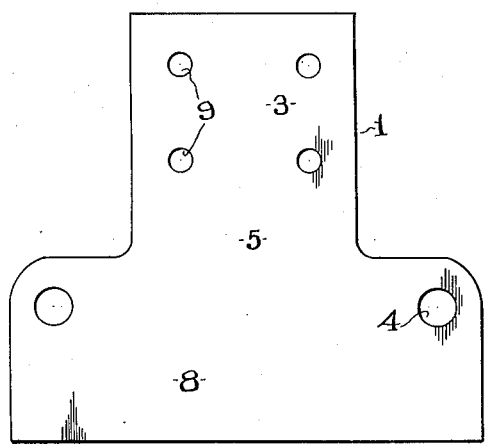
Figure 1 is a plan view of a punched out blank before it is formed into an improved attachment constituting an outside or connecting link side bar.

Referring to the annexed drawings in which the same parts are indicated by the same respective numbers in the several views, a blank 1, Figure 1, is formed into the improved attachment having an upper platform or top portion 3, a relatively angular intermediate portion forming a link side bar 5, and a lower relatively angular leg 8. The attachment is termed a "Z-4 attachment," "Z" for its shape, and "4" for the number of fastening holes with which its platform top portion 3 is provided. The blank of Figure 1 serves to form an attachment for an outside or connecting link side bar, and the blank 2 of Figure 2 serves to form an attachment having an inside or roller link side bar.

Figure 2:
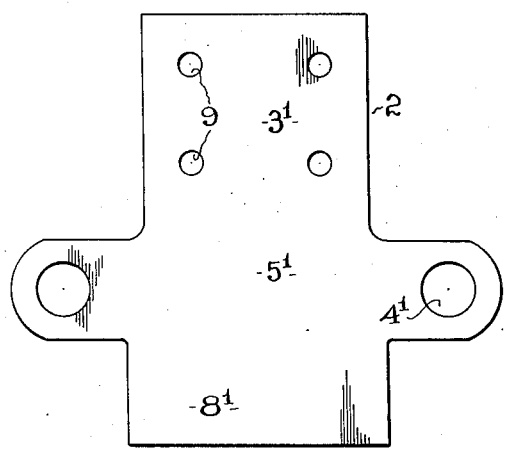
Figure 2 is a plan view, similar to Figure 1, except that the blank therein shown serves to form an attachment which is an inside or roller link side bar.
Figure 3:
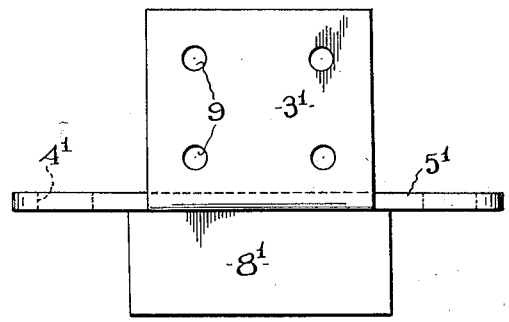
Figure 3 is a plan view of the blank shown in Figure 2 after it has been formed into the attachment.
Figure 4:
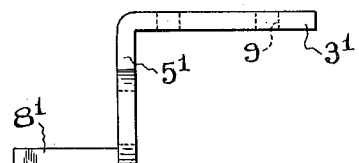
Figure 4 is an end view of the structure shown in Figure 3.

Blanks 1 and 2 are similar, the differences being that the platform portion 3 of blank 1 of Figure 1 is somewhat wider than platform portion $3^1$ of blank 2 of Figure 2 since the attachment formed from blank 1 has an outside or connecting link side bar, and the attachment formed from blank 2 has an inside or roller link side bar. Leg portion 8 is somewhat narrower than leg portion $8^1$, Figures 2, 3, and 4; also, certain articulating holes $4^1$ of the blank 2 are larger than the articulating holes 4 of blank 1, since blank 2 serves to form an inside or roller link side bar accommodating a bushing 13 for the roller 15 in which bushing 13 the articulating pin 14 has bearing. The lower angular leg 8 of the blank 1 is longer than the lower leg portion $8^1$ of the blank 2 inasmuch as the leg 8 extends beyond the two articulating axes of the entire link, Figure 5, and the leg $8^1$ lies between adjacent legs 8 and at a distance from the ends of the adjacent legs 8 indicated by the member 10 to provide for relative pivotal movement between the adjacent legs 8 and $8^1$.

The platform portions 3 and $3^1$ of the "Z-attachment" are formed with holes 9 for the securing thereto and mounting thereon by bolts 6 of carriers 16 which extend transversely across all the chain strands and are correspondingly bolted to the platform portions of the "Z-attachments" of both of the outside strands.

Figure 5:
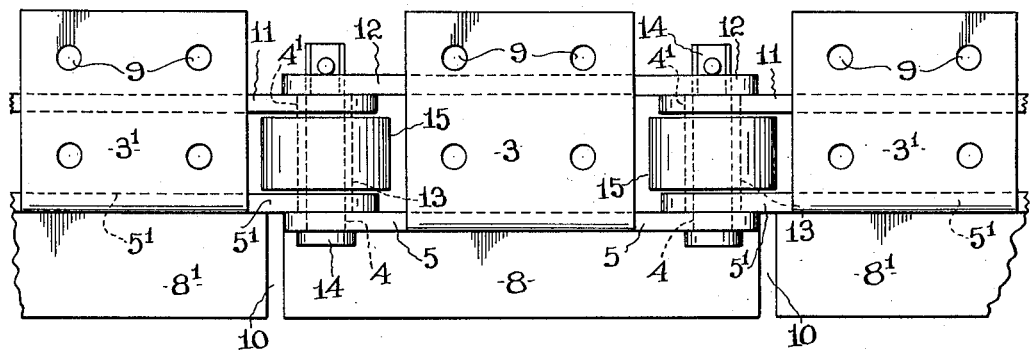
Figure 5 is a broken plan view of a three pitch section of a complete chain incorporating the improved attachment in each link, the outside connecting and the inside roller links alternating in a longitudinal direction and overlapping at their adjacent ends.
Figure 6:
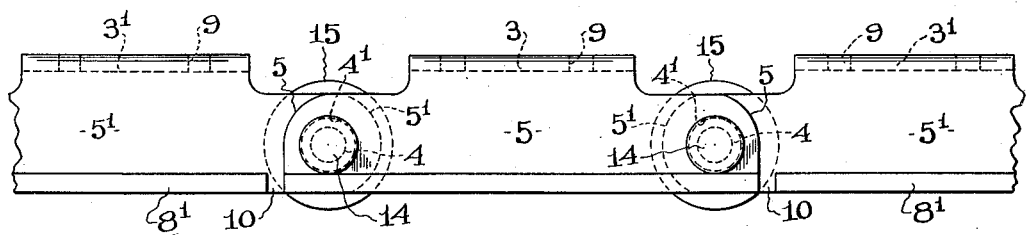
Figure 6 is an elevation of the improved attachment side of the structure shown in Figure 5.

The structure of a complete chain is illustrated in Figures 5 and 6 wherein three pitches are indicated. It will be noted that there are non-attachment side bars opposed to the side bars of the "Z-attachments" and that they are inside or roller link side bars 11 and outside or connecting link side bars 12. Articulating pins 14 are secured to the outside or connecting link side bars 5 of the attachment 1 and the outside or connecting link non-attachment side bar 12, these pins 14 turning in the bushings 13 which are secured at their ends in the inside roller link side bar $5^1$ of the attachment 2 and in the inside or roller link non-attachment side bar 11. Rollers 15 are mounted on the bushings 13 between the inside or roller link attachment side bars $5^1$ and the non-attachment side bars 11 which are engaged by driving sprockets. A chain such as is shown in Figures 5 and 6 having the "Z" attachments incorporated therein and the plain non-attachment side bars 11 and 12 will serve for all light duty conveyors.

When the multi-strand chain conveyor is designed for heavy duty, so-called "A" attachments, Figure 8, may be utilized for non-Z-4 attachment side bars, such "A" attachments having side arm portions 18 and angular lugs $18^1$ serving as top or platform portions, which platform portions are secured by bolts 19 both to the platform portions 3 and $3^1$ of the improved "Z-4" attachments and to the carriers 16.

Figure 7:
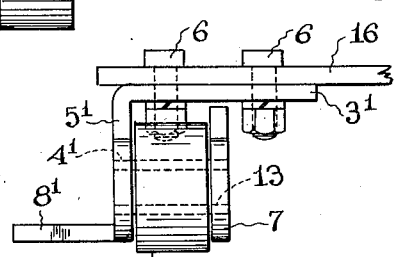
Figure 7 is an end view of a roller or inside chain link, showing the improved attachment providing one side bar, the opposite side bar being a plain bar which extends upwardly somewhat short of the plane of the bottom face of the attachment platform top portion.

The non-attachment plain side bars 11 and 12, Figure 5, may extend upwardly to an extent sufficient to engage the bottom faces of the platform portions 3 and $3^1$ of the "Z-attachments," or stop short of such engagement. In Figure 7 is shown an inner or roller link pitch in which the inner or roller link non-attachment side bar 7 stops short of such engagement.

An important feature of the improved attachment is the support for the chain on its return run. This support is provided by the legs 8 and $8^1$ which are at the top of the "Z-attachment" on the return run and may engage rollers 20 mounted in the supporting conveyor structure, such as the rollers shown in Figure 9, or may slide on angles 21 secured to the supporting conveyor structure, such as is suggested in Figure 9 or a combination of both rollers 20 and angles 21 may be utilized.

In Figure 10 there is shown a diagrammatic view of the return run of a conveyor chain being supported by rollers 20 over which the legs 8 and $8^1$ travel, thus breaking up the natural catenary which would be formed by an entirely unsupported return of the conveyor.

Some of the advantages of the "Z-attachment" are as follows:

Chain can be utilized which has the correct factor of safety for the purpose, obviating the necessity of over-chaining, thus reducing cost;

Provision for support of the chain on the return run is provided as an integral part of the chain itself;

When apron conveyors and apron feeders are utilized, the chain is located beneath the pans and is protected from dirt and grit;

The necessity for through rods as a strengthening feature is obviated, as well as the provision of such rods or other means for carrying special outboard supporting rollers; and Even for heavy duty and long conveyors, the cross-carrier itself when fastened to the outside "Z-attachments" and the inside "A-attachments" acts as a rigid cross-member between chains and distributes all loads to the center lines of the chains.

What I claim is:

1. An attachment for multi-strand endless chain conveyors having carriers connected to transversely-opposed chain strands comprising a member formed from a one-piece blank bent to provide at one end a platform for connection to and support of one end of a carrier and at the opposite end to form an outboard supporting leg for the conveyor return run, the blank being also bent intermediate the platform and the supporting leg, and in substantially relatively right-angular relation to the platform, into an outside chain side bar.

2. An attachment for multi-strand endless chain conveyors having carriers connected to transversely-opposed chain strands comprising a member formed from a one-piece blank bent to provide at one end a platform for connection to and support of one end of a carrier and at the opposite end to form a parallel outboard supporting leg for the conveyor return run, the blank being also bent intermediate the platform and the supporting leg into an outside chain side bar.

3. A conveyor formed of a pair of transversely-opposed chain strands each having a plurality of longitudinally-adjacent outside attachments, characterized as in claim 1, with overlapping side bars, non-attachment overlapping inside bars opposed to said attachment side bars, pins articulately connecting the overlapping attachment side bars and the overlapping non-attachment inside bars, and transverse carriers mounted upon and secured to the platforms of the attachments.

4. A conveyor formed of a pair of transversely-opposed chain strands each having a plurality of longitudinally-adjacent outside attachments, characterized as in claim 1, with overlapping side bars, non-attachment inside angles having overlapping side bars portions opposed to said attachment side bars and relatively right-angular portions disposed adjacently below the platforms of the several attachments, pins articulately connecting the overlapping attachment side bars and the overlapping side bar portions of said angles, and transverse carriers mounted upon and secured to the platforms of the attachments and the said right-angular portions of the angles.

5. A conveyor formed of a pair of transversely-opposed chain strands each having a plurality of longitudinally-adjacent outside attachments, characterized as in claim 1, with overlapping side bars, non-attachment overlapping inside bars opposed to said attachment side bars, pins articulately connecting the overlapping attachment side bars and the overlapping non-attachment inside bars, the attachments being arranged to provide alternately outside side bars and roller or inside side bars with the outboard supporting legs of the outside side bars lapping adjacent joints and the outboard supporting legs of the roller or inside side bars disposed between and spaced from the adjacent ends of the adjacent aforesaid lapping supporting legs, and the non-attachment overlapping inside bars alternating inside and outside, and transverse carriers mounted upon and secured to the platforms of the attachments.

6. A conveyor formed of a pair of transversely-opposed chain strands each having a plurality of longitudinally-adjacent outside attachments, characterized as in claim 1, with overlapping side bars, non-attachment overlapping inside bars opposed to said attachment side bars and extended to and abutting the platforms of the attachments, pins articulately connecting the overlapping attachment side bars and the overlapping non-attachment inside bars, and transverse carriers mounted upon and secured to the platforms of the attachments.

FERDINAND H. DALRYMPLE.

REFERENCES CITED

The following references are of record in the file of this patent:

UNITED STATES PATENTS

| Number | Name | Date |
|---|---|---|
| 736,315 | Touchstone | Aug. 11, 1903 |
| 1,380,916 | McBride | June 7, 1921 |
| 1,587,510 | Davidson | June 8, 1926 |
| 2,143,593 | Bryant | Jan. 10, 1939 |